(12) United States Patent
Kim et al.

(10) Patent No.: US 8,703,321 B2
(45) Date of Patent: Apr. 22, 2014

(54) SECONDARY BATTERY PACK

(75) Inventors: Jaerok Kim, Yongin-si (KR);
Kyeongbeom Cheong, Yongin-si (KR);
Jongman Kim, Yongin-si (KR)

(73) Assignee: Samsung SDI Co., Ltd., Yongin-si, Gyeonggi-do (KR)

(*) Notice: Subject to any disclaimer, the term of this patent is extended or adjusted under 35 U.S.C. 154(b) by 380 days.

(21) Appl. No.: 13/137,911

(22) Filed: Sep. 21, 2011

(65) Prior Publication Data

US 2012/0214038 A1    Aug. 23, 2012

(30) Foreign Application Priority Data

Feb. 21, 2011    (KR) .................... 10-2011-0015001

(51) Int. Cl.
*H01M 10/50*    (2006.01)
*H01M 2/10*    (2006.01)

(52) U.S. Cl.
USPC ......................................................... 429/120

(58) Field of Classification Search
None
See application file for complete search history.

(56) References Cited

U.S. PATENT DOCUMENTS

| | | |
|---|---|---|
| 2009/0061299 A1 | 3/2009 | Uchida et al. |
| 2013/0244077 A1* | 9/2013 | Palanchon et al. ............ 429/120 |

FOREIGN PATENT DOCUMENTS

| | | |
|---|---|---|
| JP | 5-12232 | 2/1993 |
| JP | 08-321329 | 12/1996 |
| JP | 11-126585 | 5/1999 |
| JP | 2006-147531 A | 6/2006 |
| JP | 2009-054403 | 3/2009 |
| JP | 2009-170687 | 7/2009 |
| KR | 10-2008-0032748 A | 4/2008 |
| KR | 10-2009-0110471 A | 10/2009 |
| WO | WO 2012/045175 * | 4/2012 |

OTHER PUBLICATIONS

Korean Notice of Allowance Dated Jan. 31, 2013.

* cited by examiner

*Primary Examiner* — Jonathan Crepeau

(74) *Attorney, Agent, or Firm* — Lee & Morse, P.C.

(57) ABSTRACT

A secondary battery pack includes at least two secondary batteries, each secondary battery having a first long side surface, a second opposing long side surface opposite to the first long side surface, and a peripheral wall extending between and connecting the first and second long side surfaces, a spacer interposed between the at least two secondary batteries, the spacer including at least two elastomeric members, a centrally positioned thermal conductor between the at least two elastomeric members, and a support plate under the at least two elastomeric members and contacting the thermal conductor.

16 Claims, 10 Drawing Sheets

SECONDARY BATTERY PACK

BACKGROUND

1. Field

Embodiments relate to a secondary battery pack.

2. Description of the Related Art

A pouch type secondary battery includes an electrode assembly and a pouch case surrounding and sealing the electrode assembly. The electrode assembly is formed by sequentially stacking a positive electrode plate, a separator and a negative electrode plate. In addition, the electrode assembly further includes electrode tabs welded to the positive electrode plate and the negative electrode plate, respectively, and protruding to the outside of the pouch case. The pouch case includes a case body having a space in which the electrode assembly is accommodated, and a case cover extending from one end of the case body and covering the case body.

SUMMARY

Embodiments are directed to a second battery pack.

According to an embodiment, a secondary battery pack includes at least two secondary batteries, each secondary battery having a first long side surface, a second opposing long side surface opposite to the first long side surface and a peripheral wall extending between and connecting the first and second long side surfaces, and a spacer interposed between the at least two secondary batteries, wherein the spacer includes at least two elastomeric members, a centrally positioned thermal conductor between the at least two elastomeric members, and a support plate under the at least two elastomeric members and contacting the thermal conductor.

The spacer may be plate-shaped and may include a planar surface corresponding to the long side surface of the secondary battery. The planar surface may be horizontally aligned with the long side surface of the secondary battery. The spacer may include at least one plate having a rectangular shape.

The thermal conductor may include a plate having a planar surface. In addition, the thermal conductor may have a bottom surface contacting the support plate. Further, the thermal conductor may have a mesh-type configuration including transverse bars and longitudinal bars, the longitudinal bars and transverse bars intersecting each other. In addition, bottom ends of the longitudinal bars may contact the support plate.

The thermal conductor may include a material having higher thermal conductivity than the elastomeric members. The thermal conductor may include a metal, graphite or thermally conductive plastic. The elastomeric members may contact the first and second long side surfaces of the secondary battery.

In addition, the elastomeric members may be spaced apart from the long side surfaces of the secondary battery. The elastomeric members may include silicone or rubber.

The secondary battery pack may further include a heat dissipation plate under the secondary batteries and the spacer. The support plate may include a first connection part at a lower portion thereof, and a second connection part extending downwardly from the first connection part, and the heat dissipation plate may have a receiving part coupled with the second connection part.

In addition, the support plate may be made of a thermally conductive material.

BRIEF DESCRIPTION OF THE DRAWINGS

The embodiments will become more apparent to those of ordinary skill in the art by describing in detail exemplary embodiments with reference to the attached drawings, in which.

DETAILED DESCRIPTION

Figure 1:
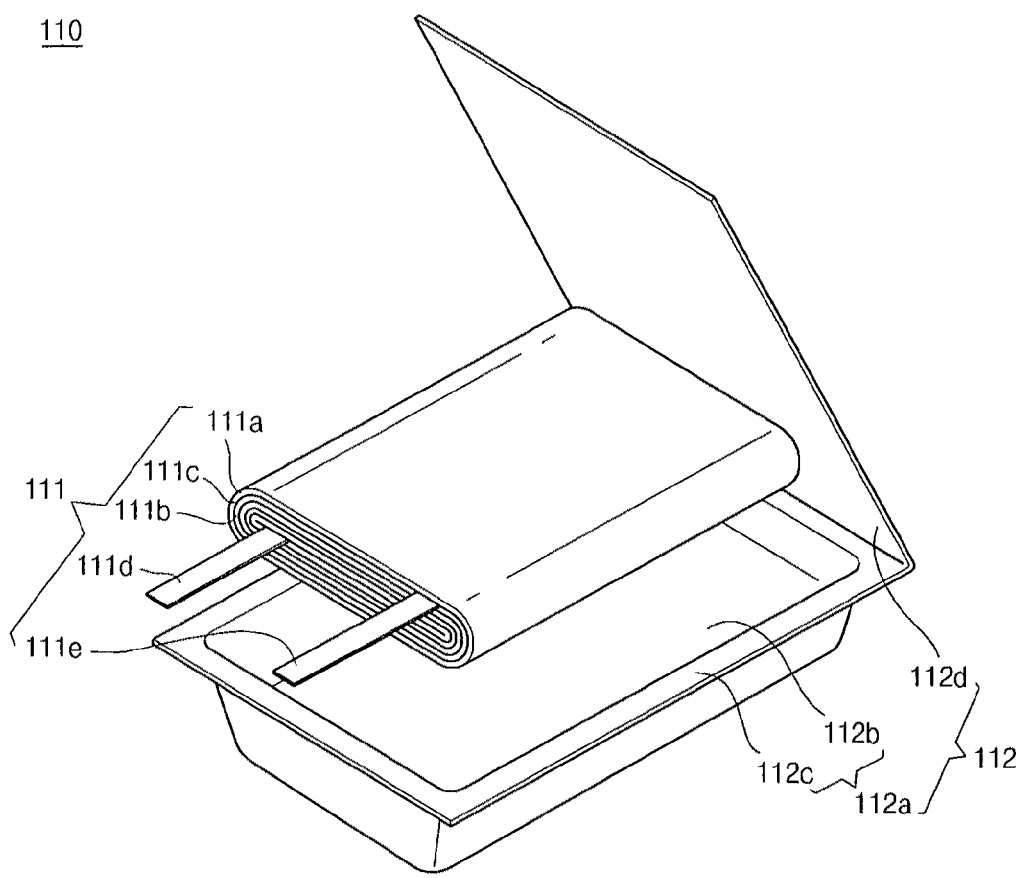
FIG. 1 illustrates an exploded perspective view of a secondary battery according to an embodiment.

Korean Patent Application No. 10-2011-0015001, filed on Feb. 21, 2011, in the Korean Intellectual Property Office, and entitled: "Secondary Battery Pack," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element or substrate, it can be directly on the other element or substrate, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout.

Figure 2:
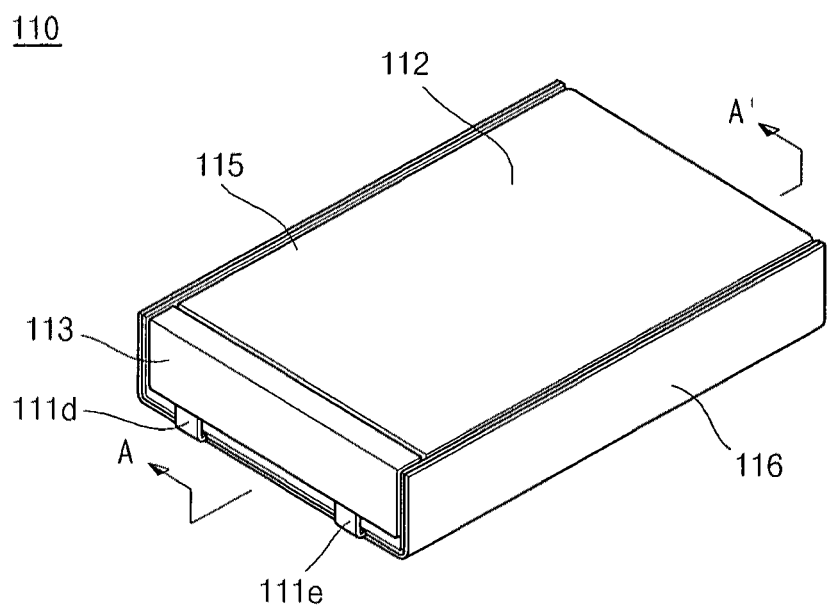
FIG. 2 illustrates a perspective view of the secondary battery shown in FIG. 1.
Figure 3:
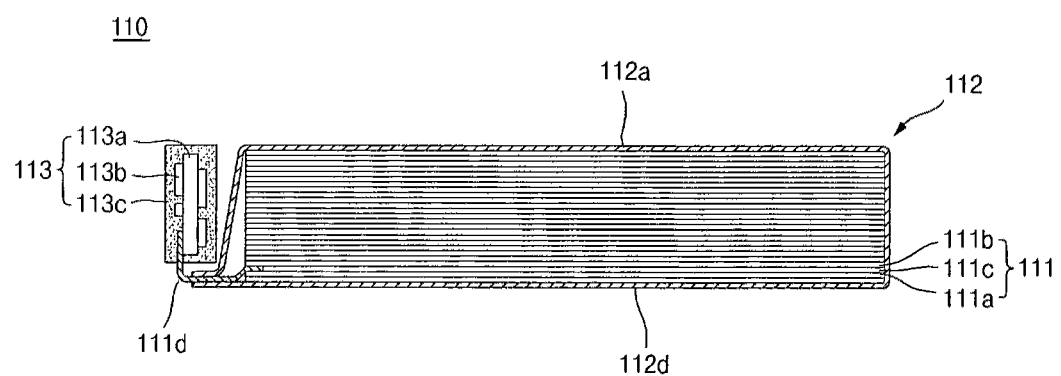
FIG. 3 illustrates a cross-sectional view, taken along the line A-A' of FIG. 2.
Figure 4:
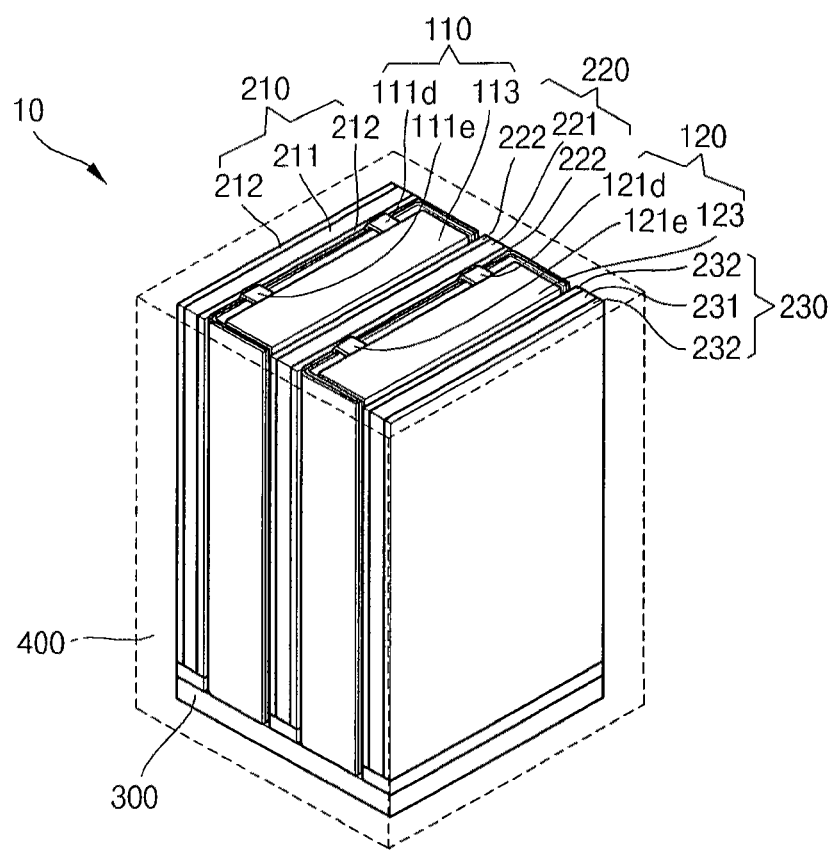
FIG. 4 illustrates an exploded perspective view of a secondary battery pack according to an embodiment.
Figure 5:
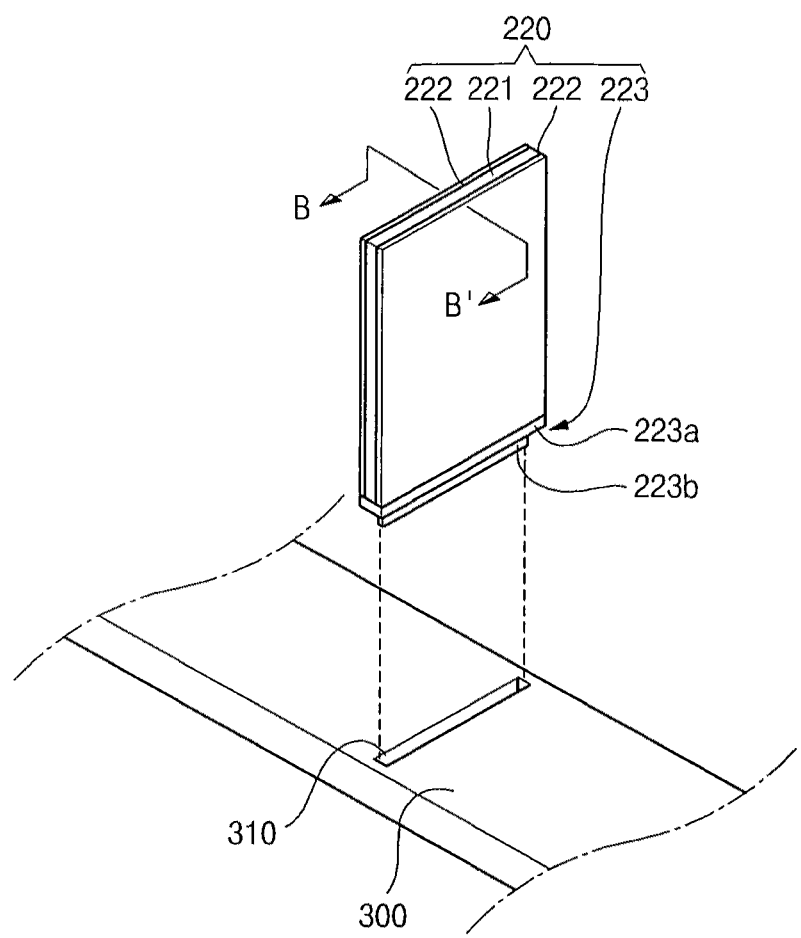
FIG. 5 illustrates an exploded perspective view of a spacer and a heat dissipation plate of the secondary battery pack of FIG. 4.
Figure 6:
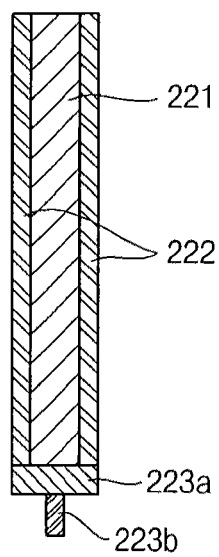
FIG. 6 illustrates a cross-sectional view, taken along the line B-B' of FIG. 5.

FIG. 1 illustrates an exploded perspective view of a secondary battery according to an embodiment. FIG. 2 illustrates a perspective view of the secondary battery shown in FIG. 1. FIG. 3 illustrates a cross-sectional view, taken along the line A-A' of FIG. 2. FIG. 4 illustrates an exploded perspective view of a secondary battery pack according to an embodiment. FIG. 5 illustrates an exploded perspective view of a spacer and a heat dissipation plate of the secondary battery pack of FIG. 4. FIG. 6 illustrates a cross-sectional view, taken along the line B-B' of FIG. 5.

Referring to FIGS. 1 to 6, the secondary battery pack 10 according to an embodiment may include a secondary battery 110 and a spacer 220. The secondary battery pack 10 may further include a heat dissipation plate 300 and a case 400.

The secondary battery pack 10 may include a stack of at least two secondary batteries, e.g., a first secondary battery 110 and a second secondary battery 120. In the following description, the secondary battery pack 10 will be described with regard to a stacked structure of two secondary batteries.

The first and second secondary batteries 110 and 120 may each be a pouch type secondary battery. Alternatively, the first and second secondary batteries 110 and 120 may each be a prismatic secondary battery. The first secondary battery 110 and the second secondary battery 120 may have the same configuration, and the following description will focus on the first secondary battery 110.

The first secondary battery 110 may include a first electrode assembly 111, a first pouch 112 accommodating or holding the first electrode assembly 111, and a first protective circuit module 113 coupled with the first pouch 112. The first pouch 112 may be sealed.

The first secondary battery 110 may have a pair of parallel and opposing long side surfaces 115, and a peripheral wall 116 that extends between and connects the opposing long side surfaces 115. The first secondary battery 110 may include the first protective circuit module 113 mounted at a terrace or upper ledge portion of the first pouch 112. The first protective circuit module 113 may form a top surface of the first pouch 112. The first electrode assembly 111 may be fabricated by winding (in a jelly roll configuration) a first positive electrode plate 111a, a first negative electrode plate 111b, and a first separator 111c (interposed between the first positive and negative electrode plates 111a and 111b). Alternatively, the first electrode assembly 111 may also be fabricated by sequentially stacking a first positive electrode plate 111a, a first separator 111c and a first negative electrode plate 111b.

The first positive electrode plate 111a may include a positive electrode current collector (formed of a highly conductive metal foil, e.g., an aluminum (Al) foil) and a positive electrode active material layer coated or disposed on surfaces of the positive electrode current collector. The first positive electrode plate 111a may include positive electrode uncoated portions (which are not coated with a positive electrode active material at opposite sides thereof) at opposite ends thereof. A first positive electrode tab 111d made of, e.g., aluminum (Al) may be bonded to one of the positive electrode uncoated portions.

The first negative electrode plate 111b may include a negative electrode current collector (formed of a highly conductive metal foil, e.g., a copper (Cu) foil) and a negative electrode active material layer coated or disposed on surfaces of the negative electrode current collector. The first negative electrode plate 111b may include negative electrode uncoated portions (which are not coated with a negative electrode active material) at opposite ends thereof A first negative electrode tab 111e made of, e.g., nickel (Ni) may be bonded to one of the negative electrode uncoated portions.

The first separator 111c may be positioned between the first positive electrode plate 111a and the first negative electrode plate 111b . The separator 111c may be made of polyethylene (PE) or polypropylene (PP), and, in an implementation, may be formed of a porous layer using a composite film of PE and PP.

The first pouch 112 may include a first pouch body 112a and a first pouch cover 112d . The first pouch body 112a may include a drawing portion 112b (having a predetermined depth) to receive the first electrode assembly 111, and a sealing portion 112c extending from the drawing portion 112b . The drawing portion 112b may include a bottom of the first pouch body 112a . The first pouch cover 112d may be adhered to the sealing portion 112c and may seal an upper opening of the sealing portion 112c while covering the drawing portion 112b . The first positive electrode tab 111d and the first negative electrode tab 111e may extend from inside the drawing portion 112b to outside the first secondary battery 110 through the sealing portion 112c at one side of the first pouch 112, as shown in FIG. 2.

The first pouch 112 may include one surface that has a denatured polypropylene attached thereto and another surface that has a vinyl compound attached thereto in view of an aluminum foil in the center. The materials that may be used to form the first pouch 112 are not limited to the materials specifically described herein.

The first protective circuit module 113 may include a protective circuit board 113a (having a wire pattern formed thereon) a plurality of control elements 113b (for controlling charging and discharging and mounted on the protective circuit board 113a) and a resin 113c (surrounding the protective circuit board 113a and the control elements 113b). In the first protective circuit module 113, the protective circuit board 113a may be electrically connected to the first positive electrode tab 111d and the first negative electrode tab 111e (that extends outside of the first pouch 112). The first protective circuit module 113 may be positioned on a terrace portion or ledge portion of the first pouch 112.

Although not shown in FIG. 2 or 3, a plurality of terminals may be formed on the protective circuit board 113a; and the plurality of terminals may be exposed to the outside through the resin 113c.

The secondary battery pack 10 may include one or more spacers. In an implementation, the secondary battery pack 10 may include a first spacer 210, a second spacer 220 and a third spacer 230, as shown in FIG. 4. The second spacer 220 may be positioned between stacked secondary batteries 110 and 120. The first and third spacers 210 and 230 may be disposed on exposed or outer sides of the stacked secondary batteries 100. For example, the first and third spacers 210 and 230 may be disposed on opposite sides of the secondary battery pack 10. Accordingly, a number of the spacers may increase according to a number of stacked secondary batteries. For example, in a case where two secondary batteries are stacked, the spacer may include one spacer positioned between the stacked secondary batteries and two spacers respectively positioned on opposite sides of the secondary battery pack 10.

Each of the spacers 210, 220, and 230 may include thermal conductors 211, 221, and 231, respectively. Each of the spacers 210, 220, and 230, may include elastomeric members 212, 222, and 232 respectively. Opposing sides of the thermal conductors 211, 221, and 231 may include the elastomeric portions 212, 222, and 232, respectively. Support plates 213, 223, and 233 may be positioned at a bottom portion of the spacers 210, 220, and 230, respectively. For example, the first spacer 210 may include a first thermal conductor 211, first elastomeric members 212 on opposing sides of the first thermal conductor 211, and a first support plate 213 extending across a bottom surface of the first thermal conductor 211, the first elastomer 212, and the first support plate 213. The second spacer 220 may include a second thermal conductor 221, second elastomeric members 222 on opposing sides of the second thermal conductor 221, and a second support plate 223 extending across a bottom surface of the second thermal conductor 221, the second elastomer 222, and the second support plate 223. The third spacer 230 may include a third thermal conductor 231, third elastomeric members 232 on opposing sides of the third thermal conductor 231, and a third support plate 233 extending across a bottom surface of the third thermal conductor 231, the third elastomeric members 232, and the third support plate 233. In an implementation, the first spacer 210 and the third spacer 230 may be disposed on outermost or exposed surfaces of the secondary batteries, and the second spacer 220 may be positioned between the secondary batteries.

The elastomeric members may support long side surfaces of the secondary battery 100. Thus, the spacers may suppress or help to prevent swelling or expansion of the secondary battery 100 while at least partially accommodating a swollen portion of the secondary battery 100 or tolerating some expansion of the secondary battery in the event that the secondary battery 100 does swell. In addition, the spacer 200 may facilitate restoration of the secondary battery 100 to its original configuration by imparting a restoring force to the secondary battery 100 when the secondary battery 100 deviates from its original state. For example, the spacer 200 may facilitate contraction of the secondary battery 100 after expansion, and thereby return to its original configuration. The spacer 200 may also facilitate the thermal conductors 211, 221, and 231 to efficiently dissipate heat transferred from the secondary battery 100 through the support plates.

The first spacer 210, the second spacer 220 and the third spacer 230 may have the same configuration, and the following description will focus on the second spacer 220. Alternatively, the first spacer 210 and the third spacer 230 may or may not have elastomeric members at surfaces thereof facing the secondary battery 100, in view of the thermal conductors.

The second spacer 220 may include a second thermal conductor 221, second elastomeric members 222, and a second support plate 223.

The second spacer 220 may have a plate shape corresponding to a long side surface of the secondary battery 100. The first secondary battery 110 and the second secondary battery 120 may be positioned on opposing sides of the second spacer 220. The second spacer 220 may be positioned to be opposed to long side surfaces of the first secondary battery 110 and the second secondary battery 120. The second spacer 220 may contact the long side surfaces of the first secondary battery 110 and the second secondary battery 120. In addition, the second spacer 220 may be spaced apart from the long side surfaces of the first secondary battery 110 and the second secondary battery 120. For example, the second spacer 220 may be disposed between the first secondary battery 110 and the second secondary battery 120 without directly contacting the first secondary battery 110 and the second secondary battery 120. Here, the second spacer 220 may more efficiently accommodate a swollen portion of the secondary battery 100 in a case where the secondary battery 100 swells comparatively a lot.

The second thermal conductor 221 may include a plate made of a thermally conductive material. The second thermal conductor 221 may be made of a material having higher thermal conductivity than the second elastomeric members 222. The second thermal conductor 221 may be made of a metal, graphite, or a thermally conductive plastic material. The second thermal conductor 221 may be a component of the second spacer 220. In addition, the second thermal conductor 221 may be exposed to opposite side surfaces and a top surface of the case 400. The second thermal conductor 221 may dissipate heat (generated during charging and discharging of the first secondary battery 110 and the second secondary battery 120) to the outside. For example, the second thermal conductor 221 may transfer the heat from the first secondary battery 110 and the second secondary battery 120 to the second support plate 223. In addition, the second thermal conductor 221 may dissipate heat to the air or to the case 400 when the second thermal conductor 221 is exposed to the opposite side surfaces and the top surface of the case 400.

The second elastomeric members 222 may be made of a material having elasticity greater than that of the second thermal conductor 221. The second elastomeric members 222 may be made of elastic silicone or rubber. The second elastomeric members 222 may be formed substantially as plate-like structures. In addition, the second elastomeric members 222 may contact opposing sides of the second thermal conductor 221. For example, the second elastomeric members 222 may sandwich the second thermal conductor 221 therebetween. Portions of the second thermal conductor 221 may be exposed to opposite side surfaces of the second elastomeric members 222. In addition, a bottom portion of the second thermal conductor 221 may be aligned with bottom portions of the second elastomeric members 222, so that the second elastomeric members 222 and the second thermal conductor 221 contact the second support plate 223.

The second elastomeric members 222 may contact long side surfaces of the first secondary battery 110 and the second secondary battery 120. Therefore, the second elastomeric members 222 may suppress or help to prevent the first secondary battery 110 and the second secondary battery 120 from swelling or expanding. When the first secondary battery 110 and the second secondary battery 120 do swell or expand, the second elastomeric members 222 may apply or provide a restoring force to the first secondary battery 110 and the second secondary battery 120, facilitating restoration of the first secondary battery 110 and the second secondary battery 120 to their original state. In addition, the second elastomeric members 222 may be spaced a predetermined distance apart from the long side surfaces or top and bottom surfaces of the first secondary battery 110 and the second secondary battery 120.

The second support plate 223 may include a plate, for example a first connection part 223a, that contacts or extends across bottom portions of the second elastomeric members 222 and the second thermal conductor 221. The second support plate 223 may be made of a thermally conductive material, like the second thermal conductor 221. In an implementation, the second support plate 223 may be integrally formed with the second thermal conductor 221. The second support plate 223 may include a second plate, for example, a second connection part 223b, as shown in FIG. 5, that extends from the first connection part 223a.

The second support plate 223 may contact the second thermal conductor 221 to facilitate transfer of the heat from the second thermal conductor 221 to the heat dissipation plate 300.

The second connection part 223b may include a plate extending downwardly from the first connection part 223a. The second connection part 223b may have a width and a length similar to a width and length of the first connection part 223a. The second connection part 223b may be inserted into or coupled with a receiving part 310 of the heat dissipation plate 300. Therefore, the second connection part 223b may contact the heat dissipation plate 300 to efficiently transfer the heat from the second thermal conductor 221.

The heat dissipation plate 300 may include a plate having a width corresponding to a width of the secondary battery 100. In addition, the heat dissipation plate 300 may have a length corresponding to a length of a plurality of secondary batteries 100 and spacers 200 alternately stacked together. The heat dissipation plate 300 may be made of a thermally conductive material, e.g., a metal. In an implementation, the heat dissipation plate 300 may be coated with a metal having superb heat transfer efficiency, thereby increasing the heat dissipation efficiency and temperature uniformity.

The heat dissipation plate 300 may be positioned under the secondary battery 100 and the spacer 200 and may contact the bottom surface of the spacer 200. Thus, the heat dissipation plate 300 may dissipate heat from the spacer 200 out of the secondary battery pack 10. The heat dissipation plate 300 may connect to a separate dissipation member positioned outside the secondary battery pack 10 for the purpose of dissipating heat more effectively.

The heat dissipation plate 300 may further include the receiving part 310. The receiving part 310 may be an open portion or opening defined in a top surface of the heat dissipation plate 300. The receiving part 310 may be a groove having a predetermined width and length. For example, the receiving part 310 may have a width and length corresponding to the length and width of the second connection part 223b. The receiving part 310 may engage with the second connection part 223b and contact the second connection part 224, thereby facilitating efficient emission of heat from the second connection part 223b.

The case 400 may receive or retain the secondary battery 100, the spacer 200 and the heat dissipation plate 300. The case 400 may have various shapes suitable to receive or retain the secondary battery 100, the spacer 200 and the heat dissipation plate 300. In addition, the case 400 may be formed such that a portion of the heat dissipation plate 300 may be exposed to the outside or may be external to the secondary battery 100.

Next, a secondary battery pack according to another embodiment will be described.

Figure 7:
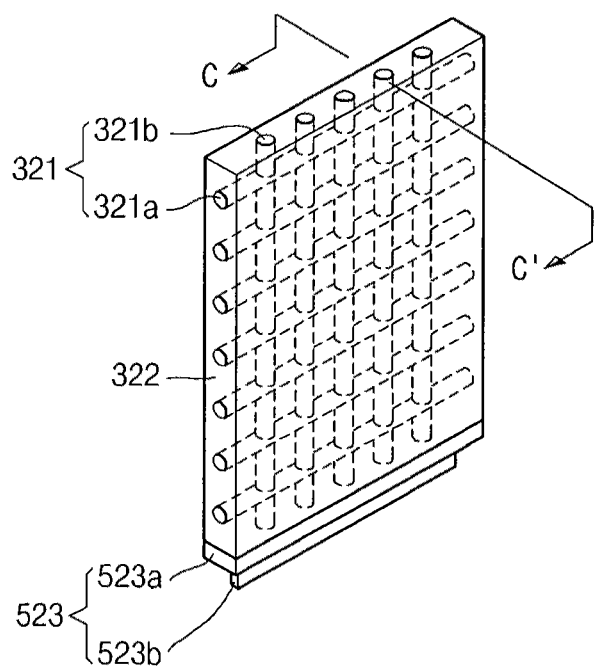
FIG. 7 illustrates a perspective view of a spacer according to another embodiment.
Figure 8:
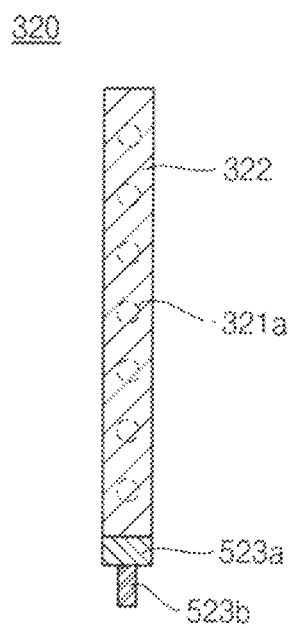
FIG. 8 illustrates a cross-sectional view, taken along the line C-C' of FIG. 7.

FIG. 7 illustrates a perspective view of a spacer according to another embodiment. FIG. 8 illustrates a cross-sectional view, taken along the line C-C' of FIG. 7.

The secondary battery pack according to the present embodiment may include a second spacer 520 (instead of the second spacer 220, described previously). In all other regards, the second battery pack 100, including the second spacer 520, may be substantially the same as the secondary battery pack according to the previous embodiment shown in FIGS. 1 to 6. Therefore, the following description will focus on the second spacer 520.

In the present embodiment, the second spacer 520 may include a plurality of second thermal conductors 521, a second elastomer 522 and a second support plate 523. The second spacer 520 may be substantially the same as the second spacer 220 according to the previous embodiment shown in FIGS. 1 to 6, except that the second spacer 520 may include second thermal conductors 521. Therefore, the following description will focus on the second thermal conductors 521, and other components of the second spacer 520 corresponding to components of the second spacer 220 shown in FIGS. 1 to 6 will only be briefly described.

The second thermal conductors 521 may be arranged in a mesh-type configuration. Thus, the second thermal conductors 521 may include transverse bars 521a and longitudinal bars 521b. The second thermal conductors 521 may be made of a thermally conductive material. According to an embodiment, the second thermal conductors 521 may be made of a material having higher thermal conductivity than the second elastomer 522. For example, the second thermal conductors 521 may be made of a metal, graphite or thermally conductive plastic.

As described above, the transverse bars 521a and longitudinal bars 521b of the second thermal conductors 521 are components of the second spacer 520. In addition, the transverse bars 521a and the longitudinal bars 521b may be formed such that ends thereof at least partially form exposed opposing side surfaces and a top surface of the second spacer 520.

For example, opposing ends of the transverse bars 521a may at least partially form an outer surface of opposing side surfaces of the second spacer 520, and one end of the longitudinal bars 521b may at least partially form an outer top surface of the second spacer 520. Further, bottom ends of the longitudinal bars 521b may contact the second support plate 523.

The second thermal conductors 521 may emit or transfer heat generated during charging and discharging of the first secondary battery 110 and the second secondary battery 120 to the outside. For example, the second thermal conductors 521 may transfer heat from the first secondary battery 110 and the second secondary battery 120 to the second support plate 523. In addition, the second thermal conductors 521 may emit heat to the air or to an outer casing when the transverse bars 521a and the longitudinal bars 521b are exposed to or flush with the opposing side surfaces and top surface of the outer casing of the second spacer 520.

The second elastomer 522 may be made of a material having elasticity greater than that of the second thermal conductors 521. The second elastomer 522 may be made of elastic silicone or rubber. The second elastomer 522 may have a substantially plate-like shape and may surround the second thermal conductors 521. According to an embodiment, the second elastomer 522 may be box-shaped and may encase the second thermal conductors 521. In addition, the second elastomer 522 may surround second thermal conductors 521 such that ends of the transverse bars 521a and the longitudinal bars 521b are exposed to or flush with the opposite side surfaces and top surface of the second elastomer 522. In addition, the second elastomer 522 may expose bottom ends of the longitudinal bars 521b to the bottom surface of the second elastomer 522.

The second support plate 523 may be similar to the second support plate 223 of the second spacer 220 shown in FIGS. 1 to 6. Thus, a detailed description thereof will not be given. The second support plate 523 may include a first connection part 523a and a second connection part 523b.

Next, the operation of the secondary battery pack will be described in more detail through examples and comparative examples.

FIGS. 9A to 9D illustrate thermal analysis result of a secondary battery pack according to an embodiment, in which the circular dark grey and circular light grey portions correspond to secondary batteries, and the rectangular light grey portions indicate spacers or empty space. In FIGS. 9A to 9D, the central portions in dark grey are high temperature portions, and the left corner portions in dark grey are relatively low temperature portions.

EXAMPLE 1

In this exemplary example, a secondary battery pack including a spacer having elastomeric members and a thermal conductor according to an embodiment was used.

Figure 9A:
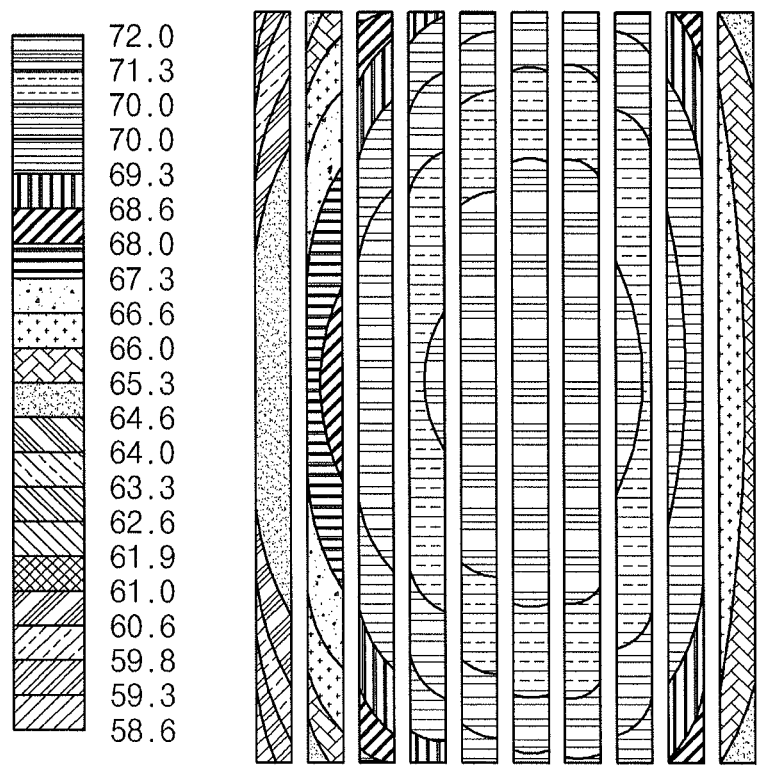
FIGS. 9A to 9D illustrate thermal analysis results of a secondary battery pack according to an embodiment.

Referring to FIG. 9A, the highest temperature of the secondary battery pack was 72.0° C., and a temperature difference between stacked secondary batteries was 13.4° C.

EXAMPLE 2

In this exemplary example, a secondary battery pack including a spacer having elastomeric members and a thermal conductor and a heat dissipation plate according to an embodiment was used.

Figure 9B:
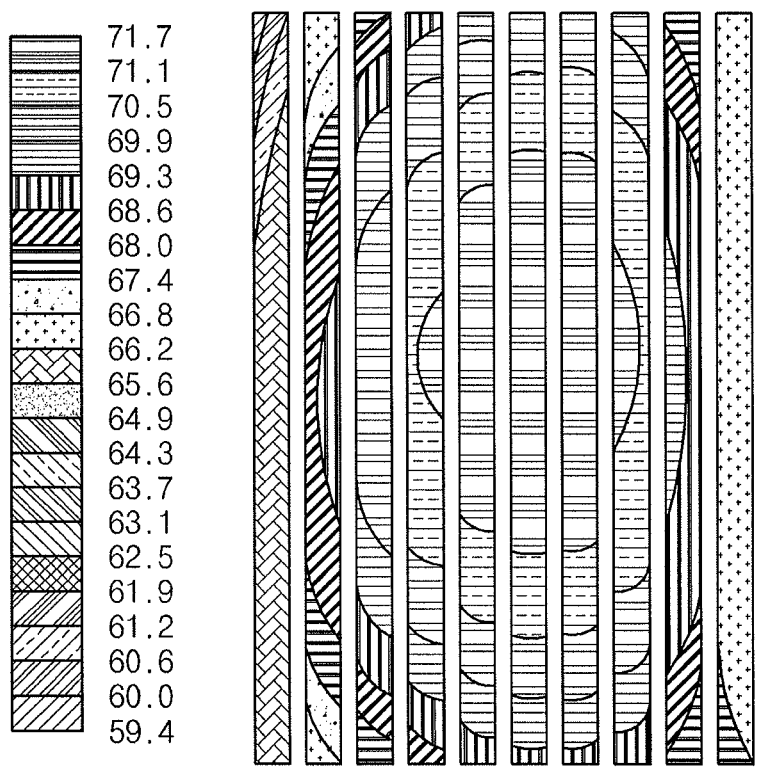

Referring to FIG. 9B, the highest temperature of the secondary battery pack was 71.7° C., and a temperature difference between stacked secondary batteries was 12.3° C.

COMPARATIVE EXAMPLE 1

In this comparative example, a secondary battery pack including stacked secondary batteries spaced apart from each other without a spacer was used.

Figure 9C:
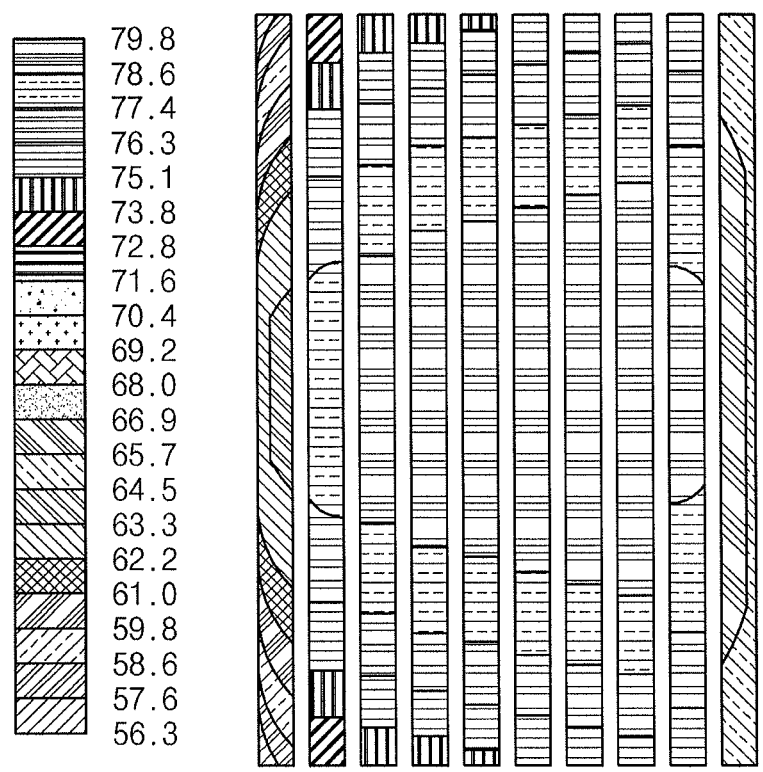

Referring to FIG. 9C, the highest temperature of the secondary battery pack was 79.8° C., and a temperature difference between stacked secondary batteries was 23.5° C.

COMPARATIVE EXAMPLE 2

In this comparative example, a secondary battery pack including a spacer having only elastomer was used (without a thermal conductor).

Figure 9D:
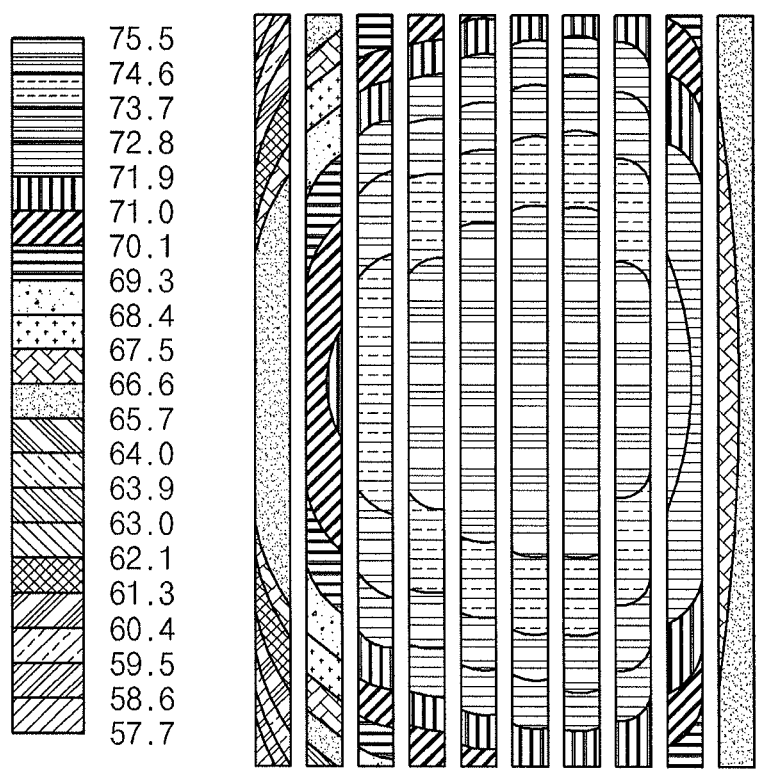

Referring to FIG. 9D, the highest temperature of the secondary battery pack was 75.5° C., and a temperature difference between stacked secondary batteries was 17.8° C.

As described above, the evaluation results show that the secondary battery pack 10 according to an embodiment had a lower temperature than the secondary battery pack without a spacer or the secondary battery pack with a spacer having an elastomer only. In addition, the secondary battery pack 10 according to an embodiment had a smaller temperature difference between secondary batteries than the secondary battery pack without a spacer or the secondary battery pack with a spacer of an elastomer only. Therefore, according to an embodiment, the spacer may include a thermal conductor and an elastomer. Thus, the spacer facilitates the heat generated from the secondary batteries to be efficiently emitted, thereby lowering the highest temperature of the secondary battery and reducing a temperature difference between secondary batteries.

The secondary battery and the pouch case of the secondary battery, according to example embodiments, may be protected from deformation, e.g., expansion or contraction, in response to a charging or discharging operation. In particular, expansion of the electrode assembly may be suppressed and contraction of the electrode assembly after expansion may be facilitated. Therefore, the conventional pouch type secondary battery may be less vulnerable to deformation based on contraction and expansion due to prolonged use of the electrode assembly. Also, heat dissipating capacity may be increased. In addition, undesirable rise of the internal temperature of the secondary battery may be avoided. The secondary battery pack may be capable of improving the life span of a secondary battery.

As described above, in the secondary battery pack according to an embodiment, swelling of the secondary battery may be suppressed and a restoring force may be imparted to the secondary battery in an event of swelling, thereby preventing deformation of the secondary battery and extending a life span of the secondary battery. In addition, in the secondary battery pack according to an embodiment, heat dissipation efficiency of the secondary battery may be improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery pack, comprising:
    at least two secondary batteries, each secondary battery having a first long side surface, a second opposing long side surface opposite to the first long side surface, and a peripheral wall extending between and connecting the first and second long side surfaces; and
    a spacer interposed between the at least two secondary batteries,
    wherein the spacer includes at least two elastomeric members, a centrally positioned thermal conductor between the at least two elastomeric members, and a support plate under the at least two elastomeric members and contacting the thermal conductor.

2. The secondary battery pack as claimed in claim 1, wherein the spacer is plate-shaped and includes a planar surface corresponding with the long side surface of the secondary battery.

3. The secondary battery pack as claimed in claim 2, wherein the planar surface is horizontally aligned with the long side surface of the secondary battery.

4. The secondary battery pack as claimed in claim 2, wherein the spacer includes at least one plate having a rectangular shape.

5. The secondary battery pack as claimed in claim 1, wherein the thermal conductor includes a plate having a planar surface.

6. The secondary battery pack as claimed in claim 1, wherein the thermal conductor has a bottom surface contacting the support plate.

7. The secondary battery pack as claimed in claim 1, wherein the thermal conductor has a mesh-type configuration including transverse bars and longitudinal bars, the longitudinal bars and the transverse bars intersecting each other.

8. The secondary battery pack as claimed in claim 7, wherein bottom ends of the longitudinal bars contact the support plate.

9. The secondary battery pack as claimed in claim 1, wherein the thermal conductor includes a material having higher thermal conductivity than the elastomeric members.

10. The secondary battery pack as claimed in claim 1, wherein the thermal conductor includes a metal, graphite, or a thermally conductive plastic.

11. The secondary battery pack as claimed in claim 1, wherein the elastomeric members contact the first and second long side surfaces of the secondary battery.

12. The secondary battery pack as claimed in claim 1, wherein the elastomeric members are spaced apart from the long side surfaces of the secondary battery.

13. The secondary battery pack as claimed in claim 1, wherein the elastomeric members include silicone or rubber.

14. The secondary battery pack as claimed in claim 1, further comprising a heat dissipation plate under the secondary batteries and the spacer.

15. The secondary battery pack as claimed in claim 14, wherein:
    the support plate includes a first connection part at a lower portion thereof and a second connection part extending downwardly from the first connection part, and
    the heat dissipation plate has a receiving part coupled with the second connection part.

16. The secondary battery pack as claimed in claim 1, wherein the support plate is made of a thermally conductive material.

\* \* \* \* \*